(12) United States Patent
Schramm et al.

(10) Patent No.: US 12,502,895 B2
(45) Date of Patent: Dec. 23, 2025

(54) PRINTING SYSTEMS FOR GENERATING OPTIMIZED IMAGES

(71) Applicant: Hewlett-Packard Development Company, L.P., Spring, TX (US)

(72) Inventors: Morgan T. Schramm, Vancouver, WA (US); Wen-Yu Lian, Vancouver, WA (US); Jay S. Gondek, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 153 days.

(21) Appl. No.: 18/565,737

(22) PCT Filed: Jun. 4, 2021

(86) PCT No.: PCT/US2021/035942
§ 371 (c)(1),
(2) Date: Nov. 30, 2023

(87) PCT Pub. No.: WO2022/256019
PCT Pub. Date: Dec. 8, 2022

(65) Prior Publication Data
US 2024/0367443 A1    Nov. 7, 2024

(51) Int. Cl.
*B41J 2/205*     (2006.01)
*G06K 15/02*    (2006.01)
*G06K 15/10*    (2006.01)

(52) U.S. Cl.
CPC .......... *B41J 2/2056* (2013.01); *G06K 15/102* (2013.01); *G06K 15/1872* (2013.01)

(58) Field of Classification Search
CPC .... B41J 2/2056; B41J 2/2054; B41J 2/04571; B41J 2/195; B41J 2/04508; B41J 2/04526; B41J 2/04535; B41J 2/04536; B41J 2/04545; B41J 2/04558; B41J 2/2132; B41J 2/512; B41J 19/145; B41J 19/147; G06K 15/102; G06K 15/1872; H04N 1/605; H04N 1/58
See application file for complete search history.

(56) References Cited

U.S. PATENT DOCUMENTS

| 3,835,777 A | 9/1974 | Krygeris et al. |
| 6,027,200 A | 2/2000 | Takahashi et al. |

(Continued)

FOREIGN PATENT DOCUMENTS

| CN | 110997338 A | 4/2020 |
| JP | 2006-239995 A | 9/2006 |

(Continued)

*Primary Examiner* — Kristal Feggins
(74) *Attorney, Agent, or Firm* — Foley & Lardner LLP

(57) ABSTRACT

A printing system includes a machine readable storage medium storing instructions and a processor to execute the instructions. The processor is to execute the instructions to receive a source image comprising a plurality of regions and analyze each region of the plurality of regions to determine an ink density of each region. The processor is to execute the instructions to further in response to the ink density for a region exceeding a threshold, deplete the ink density for the region; and in response to the ink density for a region not exceeding the threshold, maintain the ink density for the region. The processor is to execute the instructions to further combine the depleted regions and the maintained regions to generate an optimized image.

12 Claims, 9 Drawing Sheets

(56) References Cited

U.S. PATENT DOCUMENTS

| | | |
|---|---|---|
| 2002/0085055 A1 | 7/2002 | Shimada et al. |
| 2008/0216684 A1 | 9/2008 | Horai et al. |
| 2012/0019583 A1 | 1/2012 | Fujimoto et al. |
| 2012/0154470 A1 | 6/2012 | Nishitani |
| 2020/0142645 A1 | 5/2020 | Wibbels et al. |

FOREIGN PATENT DOCUMENTS

| | | |
|---|---|---|
| JP | 2007-118238 A | 5/2007 |
| JP | 2017-081142 A | 5/2017 |
| RU | 2505415 C2 | 1/2014 |
| WO | 2020/180288 A1 | 9/2020 |

PRINTING SYSTEMS FOR GENERATING OPTIMIZED IMAGES

BACKGROUND

An inkjet printing system, as one example of a fluid ejection system, may include a printhead, an ink supply which supplies liquid ink to the printhead, and an electronic controller which controls the printhead. The printhead, as one example of a fluid ejection device, ejects drops of ink through a plurality of nozzles or orifices and toward a print medium, such as a sheet of paper, so as to print onto the print medium. In some examples, the orifices are arranged in at least one column or array such that properly sequenced ejection of ink from the orifices causes characters or other images to be printed upon the print medium as the printhead and the print medium are moved relative to each other.

DETAILED DESCRIPTION

Figure 1A:
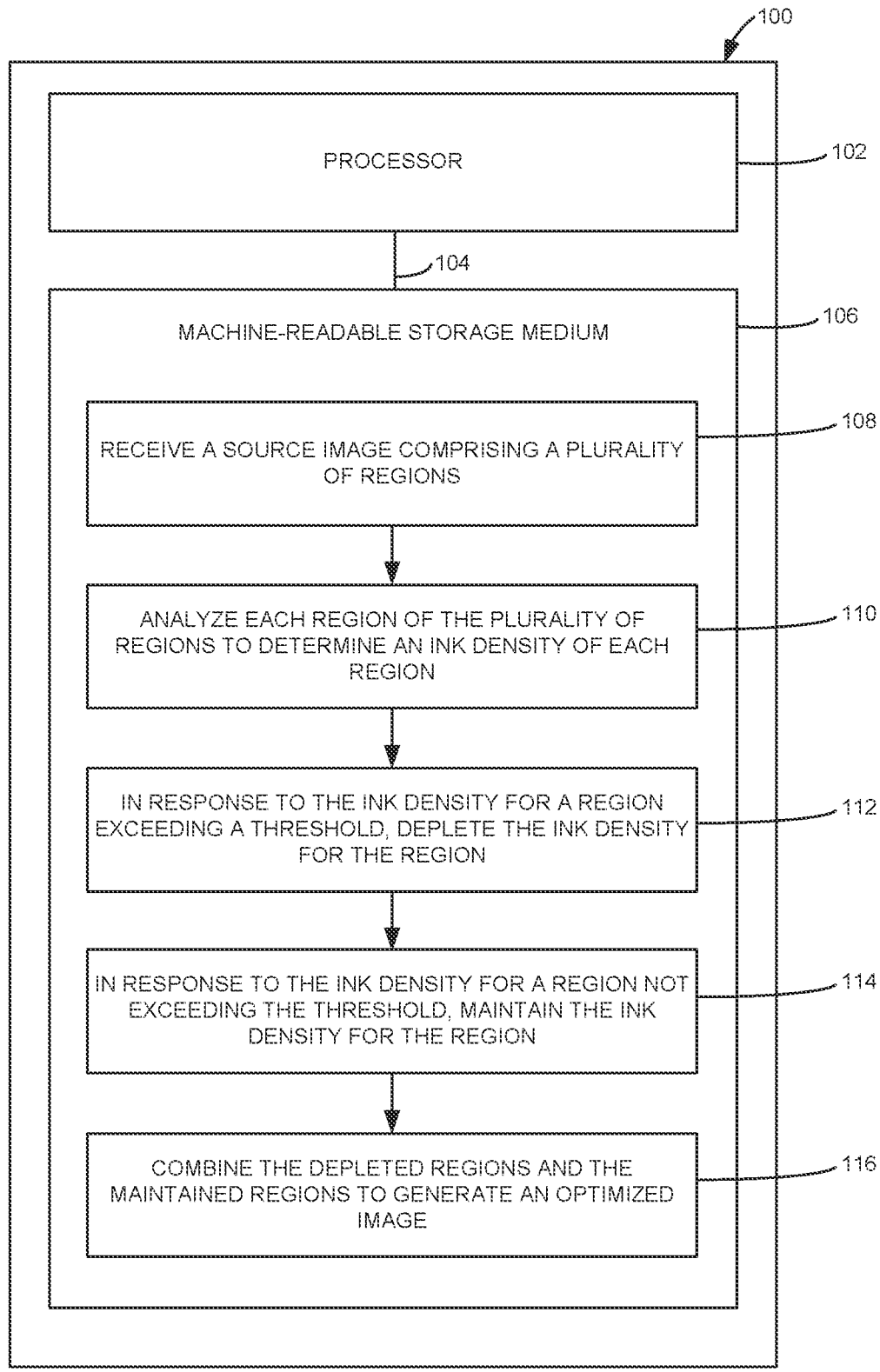
FIGS. 1A-1E are block diagrams illustrating one example of a processing system for generating optimized images.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Duplex print modes of a printing system may fail under certain conditions. For example, if the first side printed is too dense, the print media may curl and prevent re-feeding of the print media into the print mechanism resulting in a failure to print the second side. Uniform depletion of 50% or a special depleted colormap may be applied to the first side when printing to limit the amount of ink applied to the print media and to help prevent paper path issues. Uniform depletion, however, may cause text to look washed out.

Accordingly, disclosed herein are printing systems that may include an algorithm that selectively limits the amount of ink applied to the first side of a print media for a duplex print job based on the ink density in local regions of a source image to help avoid print mechanism jams. Regions of the source image to be printed on the first side of the print media may be analyzed to determine the ink density of each region. If the ink density of a region exceeds a threshold, the ink density for the region is depleted. If the ink density of a region does not exceed the threshold, the ink density for the region is not depleted. The depleted regions and the undepleted regions are combined to generate an optimized image for printing. In some examples, prior to analyzing each region of the source image, text and/or thin lines are separated from the source image and not analyzed. In this case, the depleted regions, the undepleted regions, and the text and/or thin lines are then combined to generate the optimized image for printing. By reducing the ink density in selected regions, curling of the print media that may prevent the print media from being re-fed into the print mechanism resulting in a failure to print the second side of the print media may be avoided.

FIGS. 1A-1E are block diagrams illustrating one example of a processing system 100 for generating optimized images. In one example, processing system 100 may be part of a printing system 200, which will be further described below with reference to FIG. 2. Processing system 100 includes a processor 102 and a machine-readable storage medium 106. Processor 102 is communicatively coupled to machine-readable storage medium 106 through a communication path 104. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 102 includes one (i.e., a single) central processing unit (CPU) or microprocessor or more than one (i.e., multiple) CPU or microprocessor, and/or other suitable hardware devices for retrieval and execution of instructions stored in machine-readable storage medium 106. Processor 102 may fetch, decode, and execute instructions 108-116 to generate an optimized image.

Processor 102 may fetch, decode, and execute instructions 108 to receive a source image comprising a plurality of regions (e.g., source image 300 to be described below with reference to FIG. 3A). In one example, processing system 100 may receive the source image from a host device (e.g., computer, tablet, etc.) communicatively coupled to the processing system 100 (e.g., via a wired or wireless connection). Processor 102 may fetch, decode, and execute instructions 110 to analyze each region of the plurality of regions to determine an ink density (e.g., ink volume per unit area) of each region. Processor 102 may fetch, decode, and execute instructions 112 to in response to the ink density for a region exceeding a threshold (e.g., a selected maximum ink volume per unit area), deplete (e.g., reduce) the ink density for the region. Processor 102 may fetch, decode, and execute instructions 114 to in response to the ink density for a region not exceeding the threshold, maintain (e.g., do not modify) the ink density for the region. Processor 102 may fetch, decode, and execute instructions 116 to combine the depleted regions and the maintained regions to generate an optimized image. In one example, the optimized image may be stored in machine-readable storage medium 106.

Figure 1B:
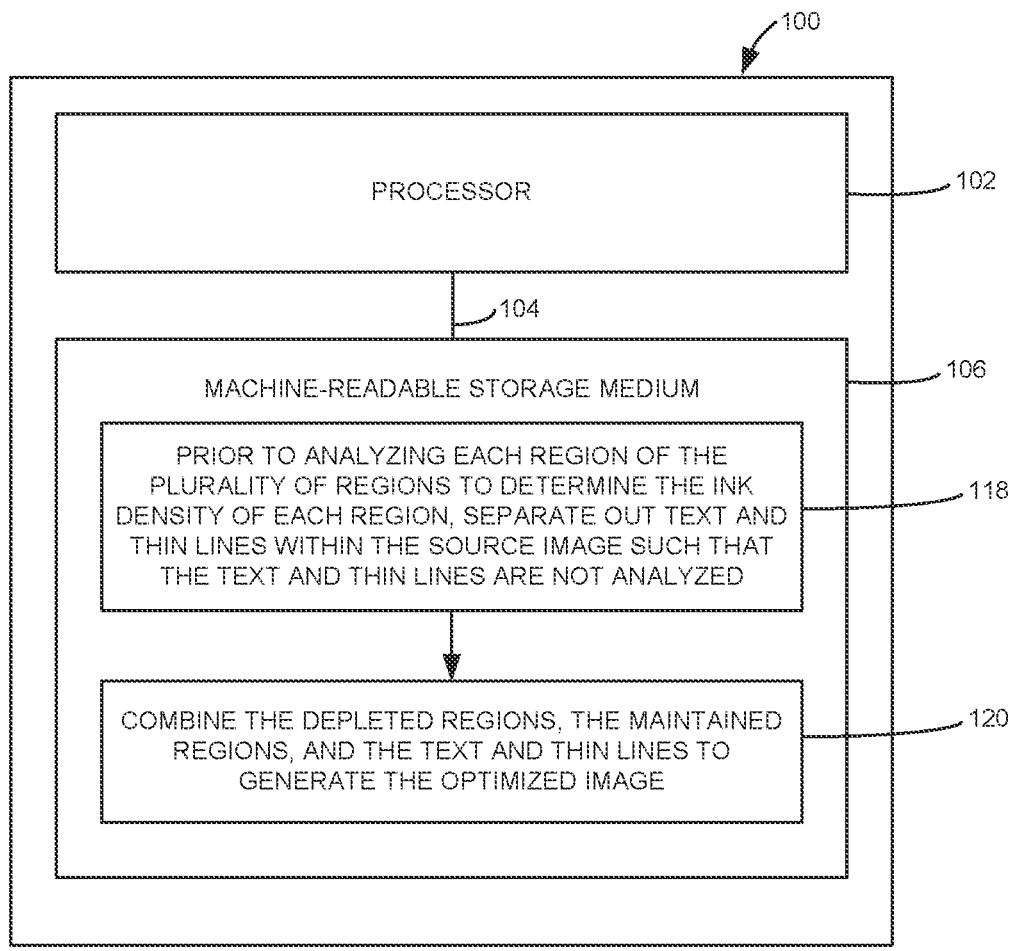

As illustrated in FIG. 1B, processor 102 may fetch, decode, and execute further instructions 118 to prior to analyzing each region of the plurality of regions to determine the ink density of each region, separate out text and thin lines within the source image such that the text and thin lines are not analyzed. In one example, the separated out text and thin lines may be stored in machine-readable storage medium 106. Processor 102 may fetch, decode, and execute further instructions 120 to combine the depleted regions, the maintained regions, and the text and thin lines to generate the optimized image.

Figure 1C:
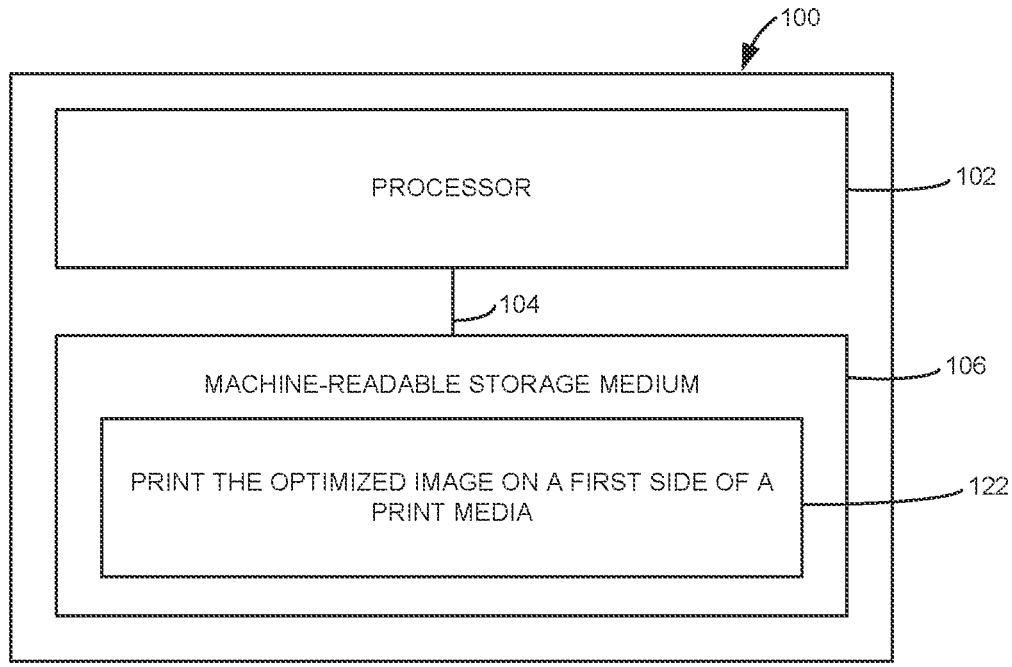
Figure 2:
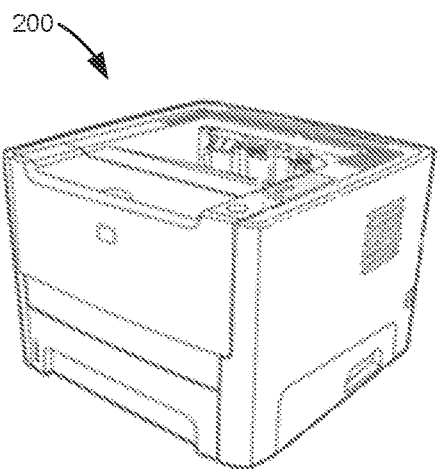
FIG. 2 illustrates one example of a printing system.

As illustrated in FIG. 1C, processor 102 may fetch, decode, and execute further instructions 122 to print the optimized image on a first side of a print media (e.g., via printing system 200 of FIG. 2). In one example, the threshold is selected to prevent curl of the print media due to printing of the optimized image on the first side of the print media.

Figure 1D:
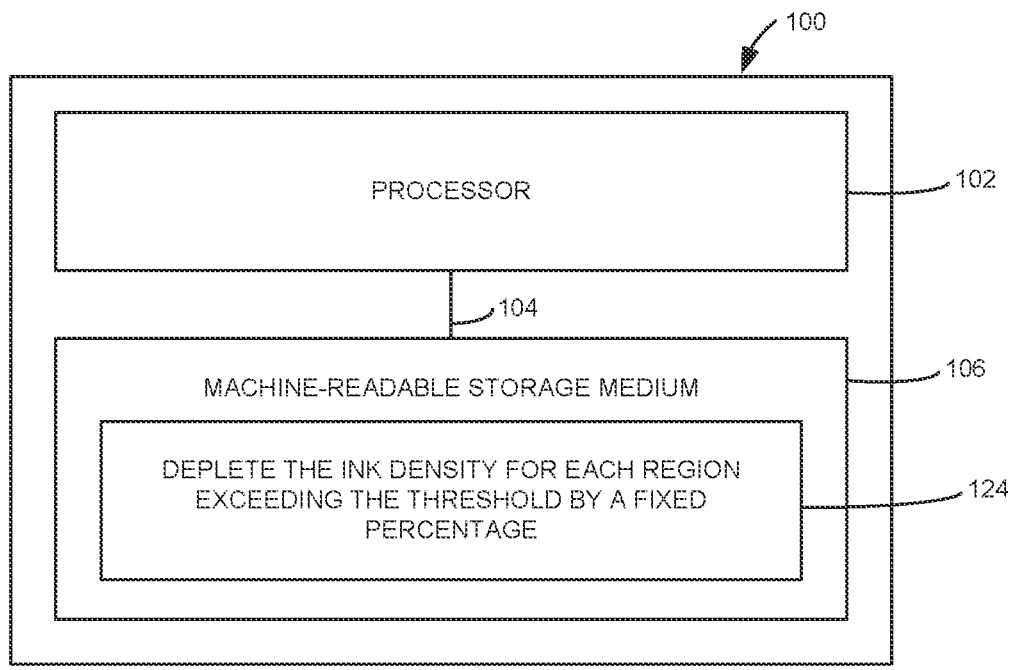
Figure 1E:
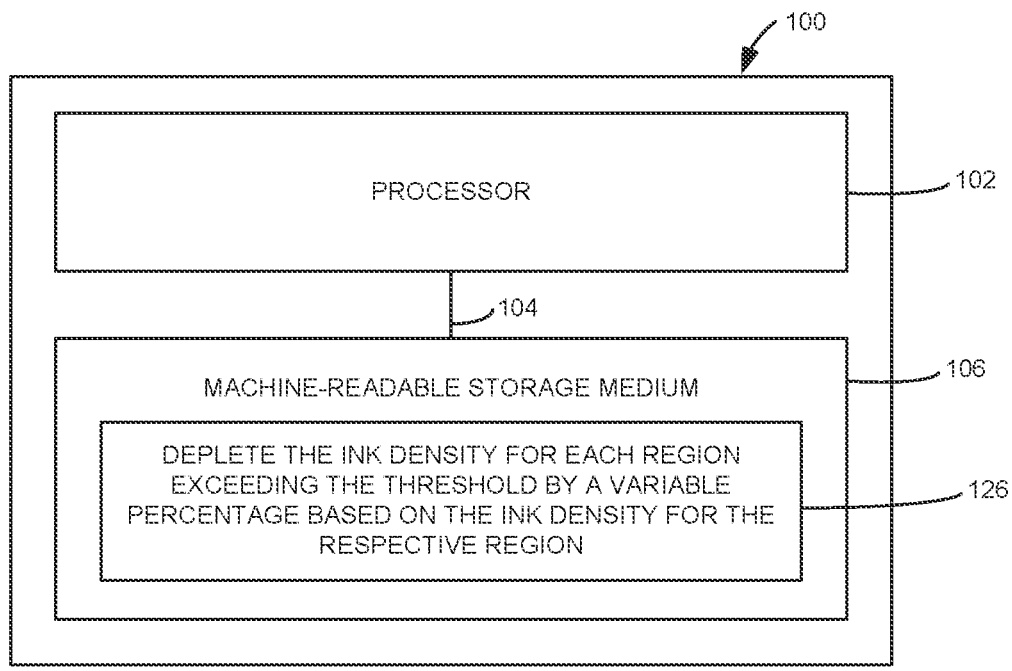

As illustrated in FIG. 1D, processor 102 may fetch, decode, and execute further instructions 124 to deplete the ink density for each region exceeding the threshold by a fixed percentage. Alternatively, as illustrated in FIG. 1E, processor 102 may fetch, decode, and execute further instructions 126 to deplete the ink density for each region exceeding the threshold by a variable percentage based on the ink density for the respective region.

As an alternative or in addition to retrieving and executing instructions, processor 102 may include one (i.e., a single) electronic circuit or more than one (i.e., multiple) electronic circuit comprising a number of electronic components for performing the functionality of one of the instructions or more than one of the instructions in machine-readable storage medium 106. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 106 is a non-transitory storage medium and may be any suitable electronic, magnetic, optical, or other physical storage device that stores executable instructions. Thus, machine-readable storage medium 106 may be, for example, a random access memory (RAM), an electrically-erasable programmable read-only memory (EEPROM), a storage drive, an optical disc, and the like. Machine-readable storage medium 106 may be disposed within system 100, as illustrated in FIGS. 1A-1E. In this case, the executable instructions may be installed on system 100. Alternatively, machine-readable storage medium 106 may be a portable, external, or remote storage medium that allows system 100 to download the instructions from the portable/external/remote storage medium. In this case, the executable instructions may be part of an installation package.

FIG. 2 illustrates one example of a printing system 200. Printing system 200 may be an inkjet printing system or another suitable fluid ejection or printing system. Printing system 200 may include a printhead, an ink supply which supplies liquid ink to the printhead, and an electronic controller which controls the printhead. In one example, the electronic controller may include processing system 100 previously described and illustrated with reference to FIG. 1A-1E or processing system 400 to be described below with reference to FIGS. 4A-4E. The printhead, as one example of a fluid ejection device, ejects drops of ink through a plurality of nozzles or orifices and toward a print medium, such as a sheet of paper, so as to print onto the print medium. In some examples, the orifices are arranged in at least one column or array such that properly sequenced ejection of ink from the orifices causes characters or other images to be printed upon the print medium as the printhead and the print medium are moved relative to each other. Printing system 200 may include duplex print modes such that images may be printed on both sides of a print medium.

Figure 3A:
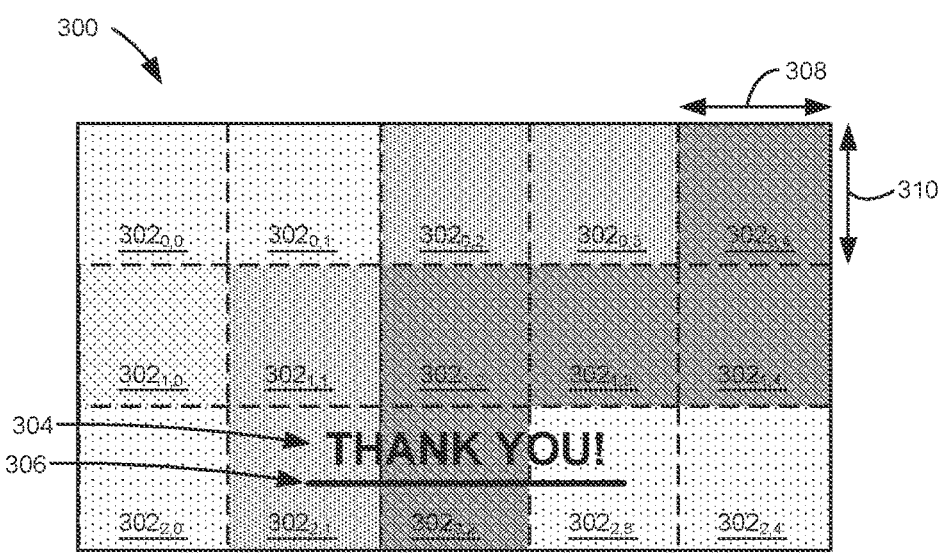
FIG. 3A illustrates one example of a source image.

FIG. 3A illustrates one example of a source image 300. Source image 300 includes a plurality of regions $302_{0,0}$ to $302_{2,4}$. In addition, regions $302_{2,1}$, $302_{2,2}$, and $302_{2,3}$ include portions of text 304 (e.g., "THANK YOU!") and thin line 306. While regions $302_{0,0}$ to $302_{2,4}$ are illustrated as square shaped in FIG. 3A, in other examples, each region $302_{0,0}$ to $302_{2,4}$ may have another suitable shape, such as rectangular, triangular, hexagonal, etc. In addition, while 15 regions $302_{0,0}$ to $302_{2,4}$ are illustrated in FIG. 3A, in other examples, source image 300 may be divided into any suitable number of contiguous regions, such as 30, 60, 120, etc.

Each region $302_{0,0}$ to $302_{2,4}$ has a width as indicated at 308 and a length as indicated at 310. In one example, the width 308 may equal the length 310. In another example, the width 308 may be greater than the length 310. In yet other examples, the width 308 may be less than the length 310. In some examples, the width 308 may be selected to be within a range between about 1 millimeter and about 25 millimeters, and the length 310 may be selected to be within a range between about 1 millimeter and about 25 millimeters.

Each region $302_{0,0}$ to $302_{2,4}$ is shaded based on the ink density for the region. The ink density for a region may be defined as the ink volume per unit area. In FIG. 3A, regions $302_{0,0}$, $302_{0,1}$, $302_{2,0}$, $302_{2,3}$, and $302_{2,4}$ have a first ink density, region $302_{1,0}$ has a second ink density greater than the first ink density, regions $302_{0,2}$, $302_{0,3}$, $302_{1,1}$, and $302_{2,1}$ have a third ink density greater than the second ink density, and regions $302_{0,4}$, $302_{1,2}$, $302_{1,3}$, $302_{1,4}$, and $302_{2,2}$ have a fourth ink density greater than the third ink density. While four ink densities are illustrated in FIG. 3A, in other examples, source image 300 may include a number of ink densities up to the number of regions $302_{0,0}$ to $302_{2,4}$ (e.g., up to 15 ink densities in the example of FIG. 3A).

Prior to printing, each region $302_{0,0}$ to $302_{2,4}$ is analyzed to determine the ink density of each region. In one example, the ink density of a region may be measured based on the predicted number of ink droplets to be deposited within the region. In other examples, the ink density of a region may be measured based on the predicted mass (e.g., nanograms) of ink to be deposited within the region. In yet other examples, the ink density may be measured based on the predicted volume (e.g., nanoliters) of ink to be deposited within the region.

Figure 3B:
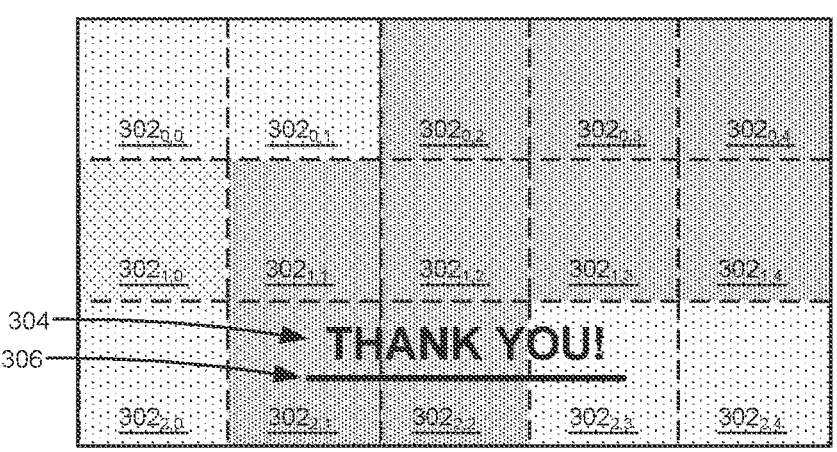
FIG. 3B illustrates one example of an optimized image.

The ink density of each region $302_{0,0}$ to $302_{2,4}$ is then compared to a threshold. The threshold may be defined as a maximum ink volume per unit area below which print media curl is mitigated or prevented. The threshold may be selected such that curl of the print media is mitigated or prevented when the optimized image is printed, thus enabling duplex printing while avoiding printer path issues. In this example, the threshold is selected to be a value between the third ink density and the fourth ink density such that regions $302_{0,4}$, $302_{1,2}$, $302_{1,3}$, $302_{1,4}$, and $302_{2,2}$ of source image 300 having the fourth ink density exceed the threshold. Accordingly, the ink density of each region $302_{0,4}$, $302_{1,2}$, $302_{1,3}$, $302_{1,4}$, and $302_{2,2}$ is depleted (e.g., reduced) as illustrated in optimized image 350 of FIG. 3B.

In one example, the ink density for each region exceeding the threshold is depleted by a fixed percentage, such as 10%, 20%, 30%, 40%, 50%, or another suitable percentage. In other examples, the ink density for each region exceeding the threshold is depleted by a variable percentage based on the ink density for the respective region. For example, if the ink density for a region exceeds the threshold by 10%, the ink density for the region may be depleted by 10%; and if the ink density for a region exceeds the threshold by 20%, the ink density for the region may be depleted by 20%; etc. In one example, the ink density for each region exceeding the threshold may be depleted by modifying the source image 300 (e.g., in a machine-readable storage medium) to provide the optimized image 350 (e.g., in the machine-readable storage medium). In another example, the ink density for each region exceeding the threshold may be depleted by tagging (e.g., object tagging) the regions of the source image 300 (e.g., in a machine-readable storage medium) exceeding the threshold. Then, during printing of the tagged source image, the tagged regions are depleted to generate the printed optimized image 350.

In some examples, any text (e.g., 304) and thin lines (e.g., 306) may be separated from the source image 300 prior to analyzing the source image to determine the ink density of each region. In one example, a thin line may be defined as a line having a thickness less than or equal to about 3 millimeters. The text and thin lines may be detected and snipped to separate them from the background. Snapshots of the text and thin lines may then be stored (e.g., in a machine-readable storage medium) for later combination with the depleted regions and the maintained regions to generate the optimized image. In this way, the text and thin lines are not depleted in the optimized image 350 of FIG. 3B.

FIGS. 4A-4E are block diagrams illustrating another example of a processing system 400 for generating optimized images. In one example, processing system 400 may be part of a printing system 200 as previously described and illustrated with reference to FIG. 2. Processing system 400 includes a processor 402 and a machine-readable storage medium 406. Processor 402 is communicatively coupled to machine-readable storage medium 406 through a communication path 404. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 402 includes one (i.e., a single) central processing unit (CPU) or microprocessor or more than one (i.e., multiple) CPU or microprocessor, and/or other suitable hardware devices for retrieval and execution of instructions stored in machine-readable storage medium 406. Processor 402 may fetch, decode, and execute instructions 408-414 to generate an optimized image.

Processor 402 may fetch, decode, and execute instructions 408 to receive a source image comprising a plurality of regions (e.g., source image 300 of FIG. 3A). In one example, processing system 400 may receive the source image from a host device (e.g., computer, tablet, etc.) communicatively coupled to the processing system 400 (e.g., via a wired or wireless connection). Processor 402 may fetch, decode, and execute instructions 410 to analyze each region of the plurality of regions to determine an ink density of each region. Processor 402 may fetch, decode, and execute instructions 412 to in response to the ink density for a region exceeding a threshold, tag the region for depletion of the ink density. Processor 402 may fetch, decode, and execute instructions 414 to during printing of an optimized image based on the source image, deplete the ink density of the respective regions tagged for depletion of the ink density and maintain the ink density of the regions not tagged for depletion of the ink density.

Figure 4A:
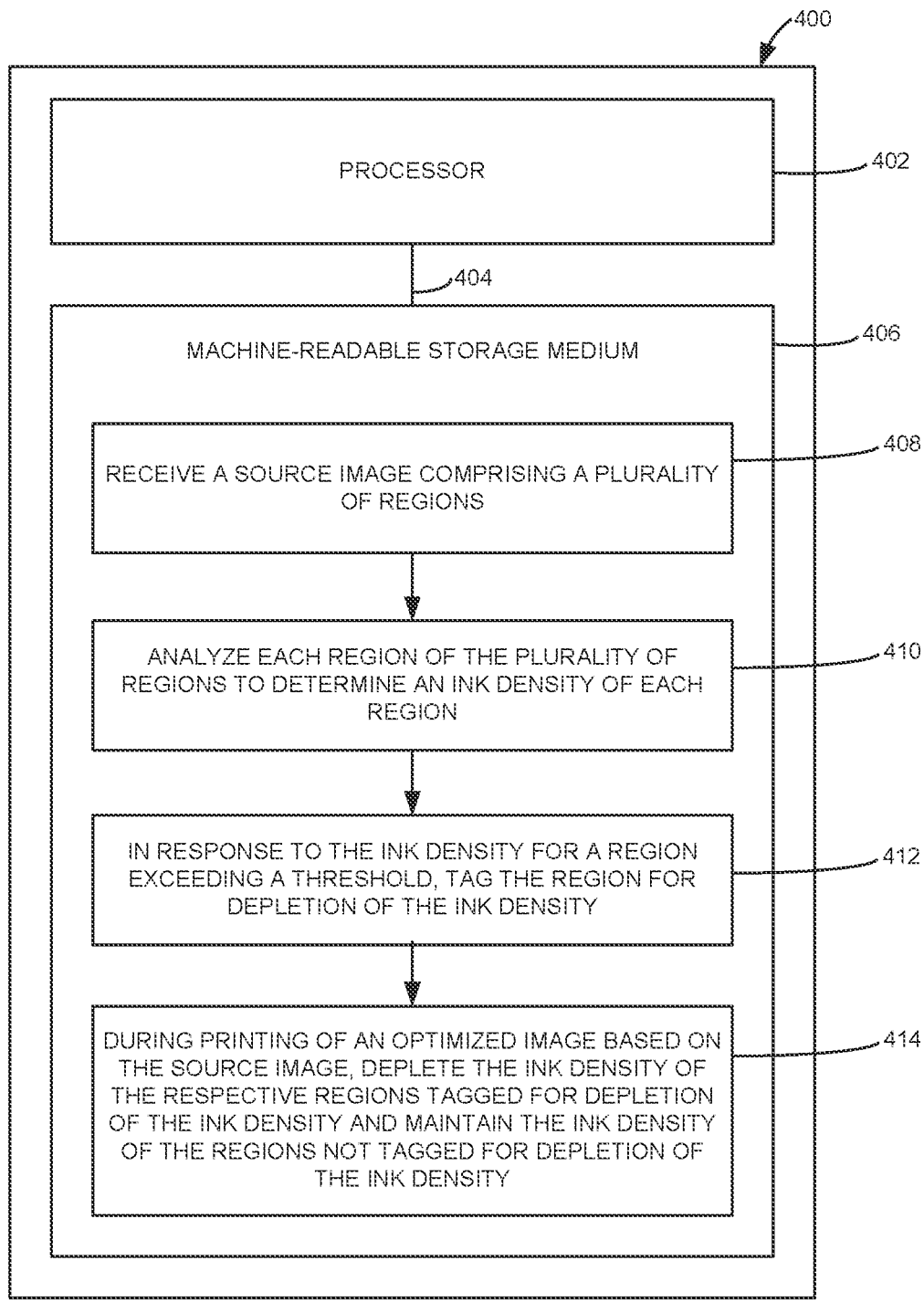
FIGS. 4A-4E are block diagrams illustrating another example of a processing system for generating optimized images.
Figure 4B:
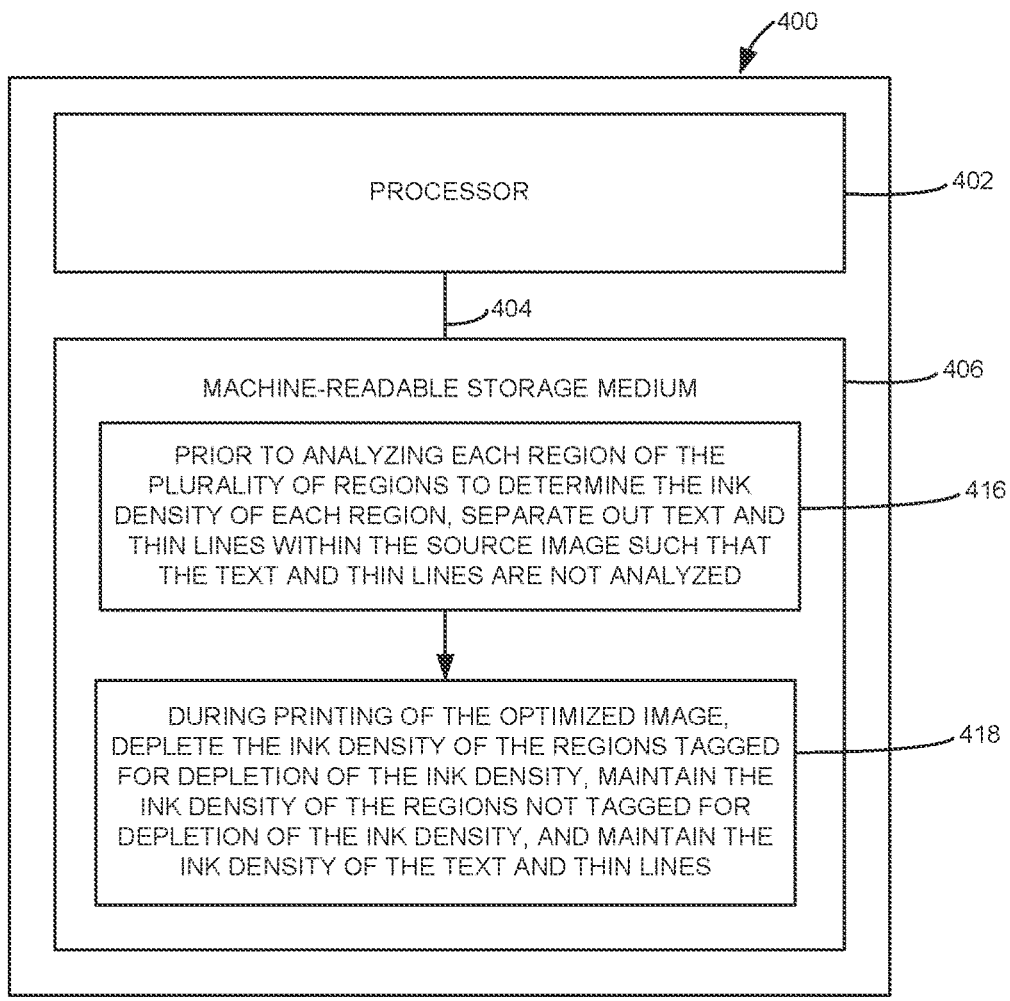

As illustrated in FIG. 4B, processor 402 may fetch, decode, and execute further instructions 416 to prior to analyzing each region of the plurality of regions to determine the ink density of each region, separate out text and thin lines within the source image such that the text and thin lines are not analyzed. Processor 402 may fetch, decode, and execute further instructions 418 to during printing of the optimized image, deplete the ink density of the regions tagged for depletion of the ink density, maintain the ink density of the regions not tagged for depletion of the ink density, and maintain the ink density of the text and thin lines.

Figure 4C:
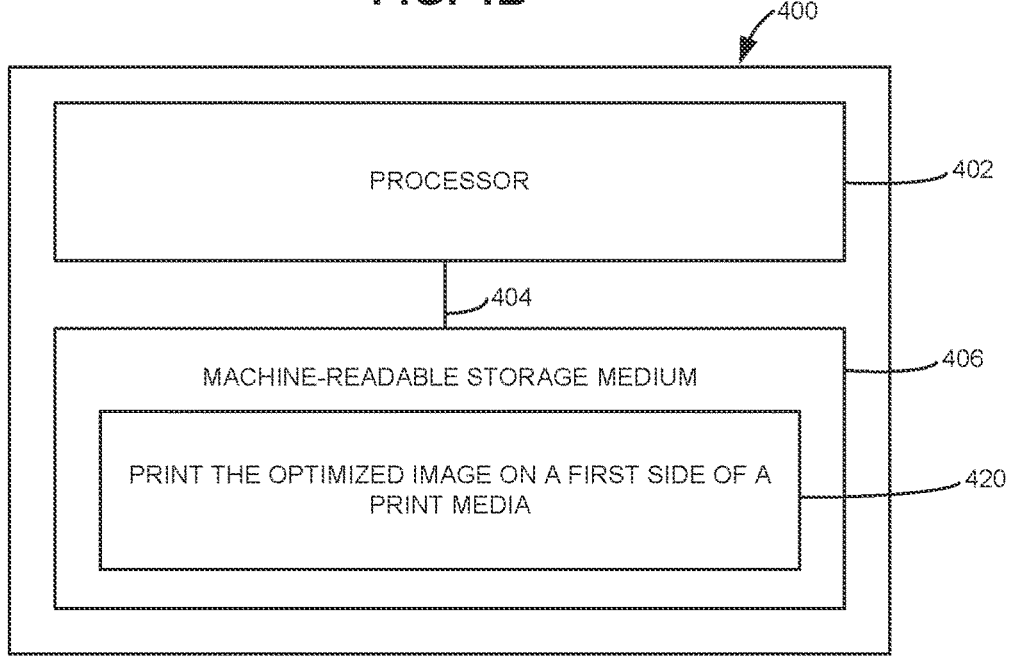

As illustrated in FIG. 4C, processor 402 may fetch, decode, and execute further instructions 420 to print the optimized image on a first side of a print media (e.g., via printing system 200 of FIG. 2). In one example, the threshold is selected to prevent curl of the print media due to printing of the optimized image on the first side of the print media.

Figure 4D:
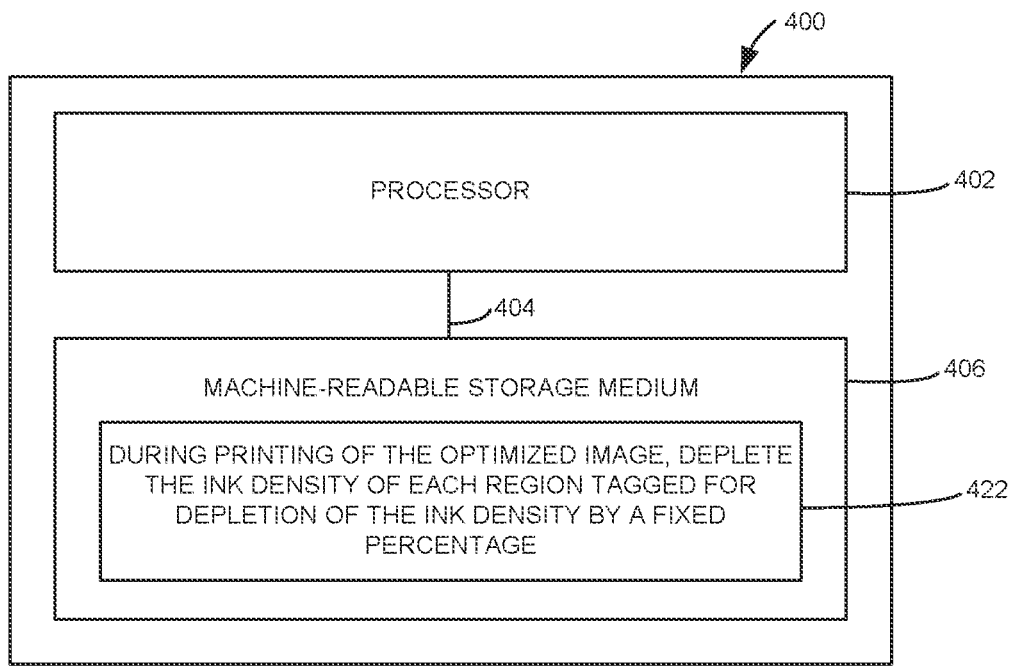
Figure 4E:
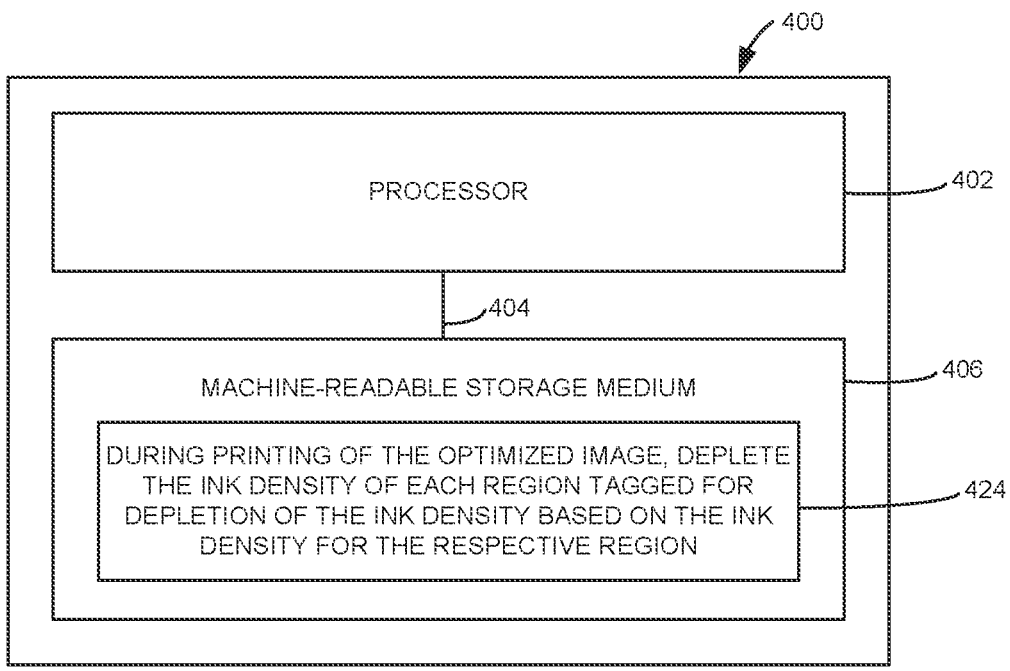

As illustrated in FIG. 4D, processor 402 may fetch, decode, and execute further instructions 422 to during printing of the optimized image, deplete the ink density of each region tagged for depletion of the ink density by a fixed percentage. Alternatively, as illustrated in FIG. 4E, processor 402 may fetch, decode, and execute further instructions 424 to during printing of the optimized image, deplete the ink density of each region tagged for depletion of the ink density based on the ink density for the respective region.

As an alternative or in addition to retrieving and executing instructions, processor 402 may include one (i.e., a single) electronic circuit or more than one (i.e., multiple) electronic circuit comprising a number of electronic components for performing the functionality of one of the instructions or more than one of the instructions in machine-readable storage medium 406. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 406 is a non-transitory storage medium and may be any suitable electronic, magnetic, optical, or other physical storage device that stores executable instructions. Thus, machine-readable storage medium 406 may be, for example, a RAM, an EEPROM, a storage drive, an optical disc, and the like. Machine-readable storage medium 406 may be disposed within system 400, as illustrated in FIGS. 4A-4E. In this case, the executable instructions may be installed on system 400. Alternatively, machine-readable storage medium 406 may be a portable, external, or remote storage medium that allows system 400 to download the instructions from the portable/external/remote storage medium. In this case, the executable instructions may be part of an installation package.

Figure 5A:
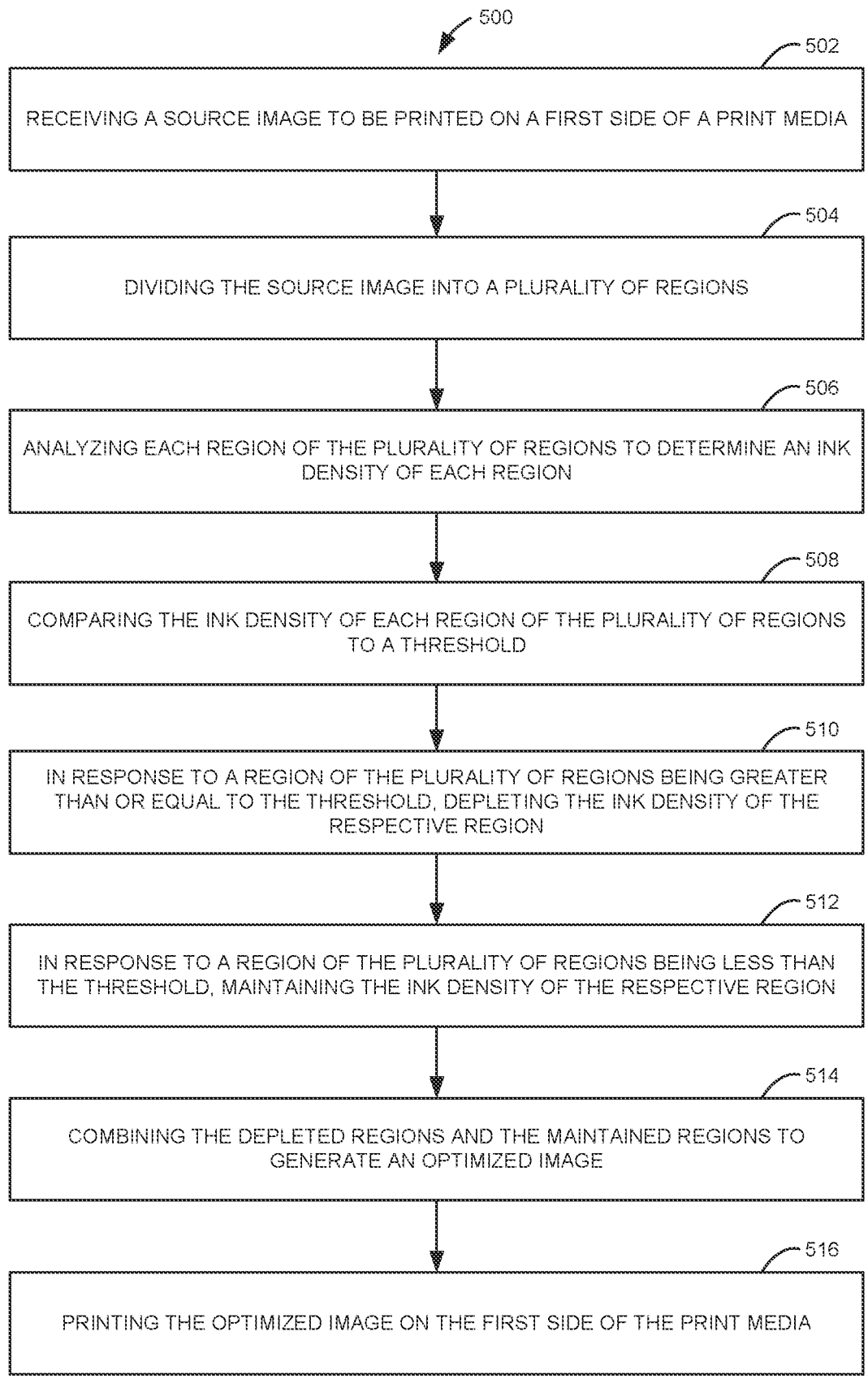
FIGS. 5A-5C are flow diagrams illustrating one example of a method for printing a duplex print job.
Figure 5B:
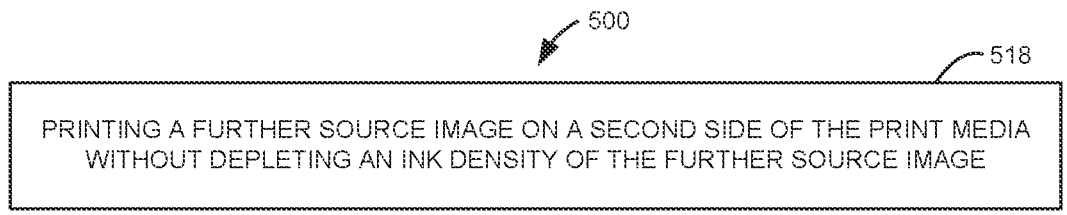
Figure 5C:
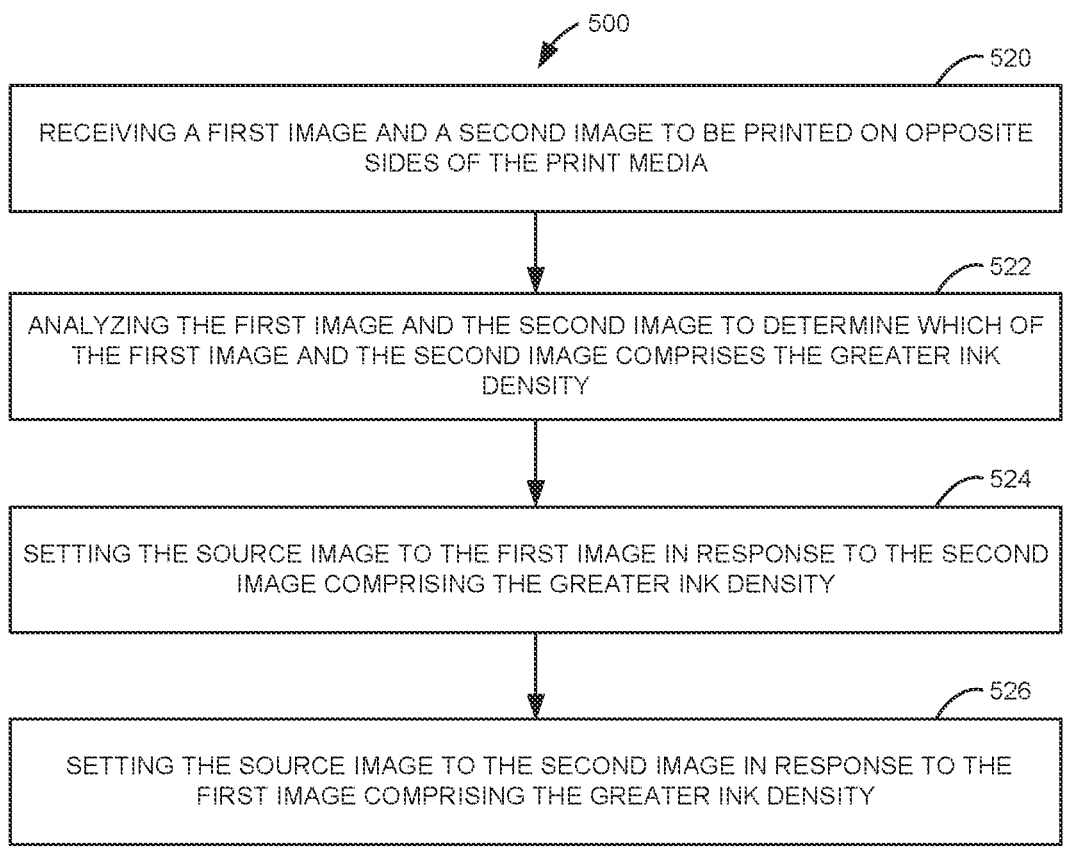

FIGS. 5A-5C are flow diagrams illustrating one example of a method 500 for printing a duplex print job. In one example, method 500 may be implemented by printing system 200 previously described and illustrated with reference to FIG. 2. As illustrated in FIG. 5A at 502, method 500 includes receiving a source image (e.g., 300 of FIG. 3A) to be printed on a first side of a print media. At 504, method 500 includes dividing the source image into a plurality of regions (e.g., regions $302_{0,0}$ to $302_{2,4}$). At 506, method 500 includes analyzing each region of the plurality of regions to determine an ink density of each region. At 508, method 500 includes comparing the ink density of each region of the plurality of regions to a threshold. At 510, method 500 includes in response to a region of the plurality of regions being greater than or equal to the threshold, depleting the ink density of the respective region. At 512, method 500 includes in response to a region of the plurality of regions being less than the threshold, maintaining the ink density of the respective region. At 514, method 500 includes combining the depleted regions and the maintained regions to generate an optimized image (e.g., 350 of FIG. 3B). At 516, method 500 includes printing the optimized image on the first side of the print media (e.g., via printing system 200 of FIG. 2).

As illustrated in FIG. 5B at 518, method 500 may further include printing a further source image on a second side of the print media without depleting an ink density of the further source image.

As illustrated in FIG. 5C at 520, method 500 may further include receiving a first image and a second image to be printed on opposite sides of the print media. At 522, method 500 may further include analyzing the first image and the second image to determine which of the first image and the second image comprises the greater ink density. At 524, method 500 may further include setting the source image to the first image in response to the second image comprising the greater ink density. At 526, method 500 may further include setting the source image to the second image in response to the first image comprising the greater ink density. In this way, the image having the greater ink density may be printed on the second side of a print media unmodified, where depletion of the density to mitigate or prevent curl is not needed to prevent paper path issues.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A printing system comprising:
a machine readable storage medium storing instructions; and
a processor to execute the instructions to:
receive a source image comprising a plurality of regions and text and thin lines;
separate out the text and thin lines within the source image;
analyze each region of the plurality of regions to determine an ink density of each region;
in response to the ink density for a region exceeding a threshold, deplete the ink density for the region;
in response to the ink density for a region not exceeding the threshold, maintain the ink density for the region; and
combine the depleted regions, the maintained regions, and the text and thin lines to generate an optimized image.

2. The printing system of claim 1, wherein the processor is to execute the instructions to further:
print the optimized image on a first side of a print media.

3. The printing system of claim 2, wherein the threshold is selected to prevent curl of the print media due to printing of the optimized image on the first side of the print media.

4. The printing system of claim 1, wherein the processor is to execute the instructions to further:
deplete the ink density for each region exceeding the threshold by a fixed percentage.

5. The printing system of claim 1, wherein the processor is to execute the instructions to further:
deplete the ink density for each region exceeding the threshold by a variable percentage based on the ink density for the respective region.

6. A printing system comprising:
a machine readable storage medium storing instructions; and
a processor to execute the instructions to:
receive a source image comprising a plurality of regions and text and thin lines;
separated out the text and thin lines within the source image;
analyze each region of the plurality of regions to determine an ink density of each region;
in response to the ink density for a region exceeding a threshold, tag the region for depletion of the ink density; and
during printing of an optimized image based on the source image, deplete the ink density of the respective regions tagged for depletion of the ink density and maintain the ink density of the text and thin lines and the regions not tagged for depletion of the ink density.

7. The printing system of claim 6, wherein the processor is to execute the instructions to further:
print the optimized image on a first side of a print media.

8. The printing system of claim 7, wherein the threshold is selected to prevent curl of the print media due to printing of the optimized image on the first side of the print media.

9. The printing system of claim 6, wherein the processor is to execute the instructions to further:
during printing of the optimized image, deplete the ink density of each region tagged for depletion of the ink density by a fixed percentage.

10. The printing system of claim 6, wherein the processor is to execute the instructions to further:
during printing of the optimized image, deplete the ink density of each region tagged for depletion of the ink density based on the ink density for the respective region.

11. A method for printing a duplex print job, the method comprising:
receiving a first image and a second image to be printed on opposite sides of a print media;
analyzing the first image and the second image to determine which of the first image and the second image comprises a greater ink density;
setting the first image as a source image in response to the second image comprising the greater ink density;
setting the second image as the source image in response to the first image comprising the greater ink density;
dividing the source image into a plurality of regions;
analyzing each region of the plurality of regions to determine an ink density of each region;
comparing the ink density of each region of the plurality of regions to a threshold;
in response to a region of the plurality of regions being greater than or equal to the threshold, depleting the ink density of the respective region;
in response to a region of the plurality of regions being less than the threshold, maintaining the ink density of the respective region;
combining the depleted regions and the maintained regions to generate an optimized image; and
printing the optimized image on the first side of the print media.

12. The method claim 11, further comprising:
  printing an image of the first and second images that was not set as the source image on a second side of the print media without depleting the ink density of the image.

* * * * *